US012638131B2

(12) United States Patent
Stechmann

(10) Patent No.: US 12,638,131 B2
(45) Date of Patent: May 26, 2026

(54) MAGNETIC BRACKET FOR USE IN MOUNTING OF HARDWARE TO A FERROMAGNETIC STRUCTURE

(71) Applicant: Eric Stechmann, Nixa, MO (US)

(72) Inventor: Eric Stechmann, Nixa, MO (US)

( * ) Notice: Subject to any disclaimer, the term of this patent is extended or adjusted under 35 U.S.C. 154(b) by 50 days.

(21) Appl. No.: 19/007,877

(22) Filed: Jan. 2, 2025

(65) Prior Publication Data

US 2025/0137585 A1      May 1, 2025

Related U.S. Application Data

(63) Continuation-in-part of application No. 18/167,675, filed on Feb. 10, 2023, now Pat. No. 12,334,623.

(51) Int. Cl.
*F16M 13/02* (2006.01)
*H01Q 1/12* (2006.01)

(52) U.S. Cl.
CPC ............ *F16M 13/022* (2013.01); *H01Q 1/12* (2013.01)

(58) Field of Classification Search
CPC ............................... F16M 13/022; H01Q 1/12
USPC ...................................................... 248/206.5
See application file for complete search history.

(56) References Cited

U.S. PATENT DOCUMENTS

| | | | |
|---|---|---|---|
| 925,281 A | 6/1909 | Bouwman | |
| 6,042,080 A * | 3/2000 | Shepherd ................ | B60R 11/00 248/688 |
| 9,577,417 B2 | 2/2017 | Stechmann | |

| | | | |
|---|---|---|---|
| 10,627,043 B2 * | 4/2020 | Wargo ...................... | H01Q 1/12 |
| 10,655,656 B2 * | 5/2020 | Franklin ................ | H01R 13/73 |
| 10,808,883 B2 | 10/2020 | Stechmann | |
| 11,274,774 B2 | 3/2022 | Stechmann | |
| 11,549,639 B2 * | 1/2023 | Georgeau .................. | F16L 3/24 |
| 11,746,808 B2 | 9/2023 | Stechmann | |
| 12,173,495 B2 * | 12/2024 | Worden .................... | F16L 3/24 |
| 12,228,230 B2 * | 2/2025 | Georgeau ................ | F16L 3/243 |
| 2002/0197107 A1 | 12/2002 | Granta | |
| 2004/0129847 A1 | 7/2004 | Searle | |
| 2006/0180391 A1 | 8/2006 | Thomas | |
| 2014/0027696 A1 | 1/2014 | Gilbert-Williams | |
| 2017/0159880 A1 * | 6/2017 | Stechmann ............. | H02G 3/30 |
| 2020/0408335 A1 * | 12/2020 | Stechmann ............. | F16L 3/221 |
| 2022/0082117 A1 * | 3/2022 | Stechmann ............. | F16L 3/221 |

OTHER PUBLICATIONS

U.S. Appl. No. 18/167,675, Notice of Allowance dated Mar. 19, 2025.

* cited by examiner

*Primary Examiner* — Anita M King
(74) *Attorney, Agent, or Firm* — Lathrop GPM LLP; Robert J. Lambrechts

(57) ABSTRACT

An apparatus for securing hardware to a surface of a structure including a base plate with an upper surface, a lower surface and a circumferential surface. The apparatus also includes a spaced apart pair of securement members mounted substantially perpendicular to the upper surface of the base plate, each of the securement members comprising an inner face and an outer face. The apparatus further includes a plurality of trays spaced apart from one another and from the lower surface of the base plate and mounted to the base plate, the spaced apart trays each including a first longitudinal end and a second longitudinal end, an upper surface and a lower surface. Also included are a plurality of magnets mounted to the lower surface of each of the plurality of trays.

22 Claims, 10 Drawing Sheets

MAGNETIC BRACKET FOR USE IN MOUNTING OF HARDWARE TO A FERROMAGNETIC STRUCTURE

RELATED APPLICATION

This application is a continuation-in-part application of U.S. application Ser. No. 18/167,675 filed on Feb. 10, 2023.

FIELD OF THE DISCLOSURE

This disclosure relates to a magnetically mounted apparatus for securing hardware, such as telecommunications devices, to a ferromagnetic structure such as a water tower.

BACKGROUND

Placing telecommunications antennas on top of water towers is a widely adopted practice that offers several benefits, both in terms of operational efficiency and infrastructure utilization. The use of magnetic brackets for securing these antennas further enhances these advantages. Water towers are typically tall structures designed to maximize gravity-fed water pressure, which coincidentally makes them excellent locations for telecommunications antennas. The elevation allows antennas to cover larger geographic areas, improving signal range and strength.

Using water towers eliminates the need to construct standalone towers, reducing costs and minimizing the environmental and aesthetic impact. It takes advantage of pre-existing structures, accelerating deployment timelines. Many water towers are in or near residential or urban centers where telecommunication coverage is most in demand. Combining utilities (water storage and telecommunications) optimizes the use of municipal or privately-owned infrastructure, providing economic benefits to tower owners and service providers alike. Water towers often already have municipal or regulatory approvals for their location and height, simplifying the permitting process for antenna installation.

Magnetic brackets do not require physical alterations to the water tower, such as drilling or welding, which can compromise the structural integrity of the tank or tower. Welding can create vulnerabilities in the coating of the water tower, leading to rust or other forms of corrosion. Magnetic brackets avoid this issue entirely. Magnetic brackets allow for quicker installation compared to welding, as they do not require specialized skills or equipment. Antennas can be easily repositioned or removed for maintenance without causing damage to the tower. Magnetic brackets eliminate the need for skilled welding labor and post-installation repairs or re-coating of the tower surface. Maintenance costs are reduced due to the ease of replacing or upgrading the antenna. Magnetic brackets offer a modular solution, allowing for adjustments or additions to the antenna array without permanent modifications to the tower. This flexibility is particularly valuable for accommodating future technology upgrades (e.g., 5G installations).

Installation with magnetic brackets can be completed faster than welding, minimizing disruptions to both the water utility and the telecommunications service. Avoiding welding reduces the risk of fire or heat-related accidents during installation. Magnetic brackets also reduce the need for hazardous materials or processes, aligning with sustainable practices.

The integration of telecommunications antennas on water towers using magnetic brackets represents a practical and innovative approach to modern telecommunications challenges. It maximizes the utility of existing infrastructure while maintaining the structural and operational integrity of the water tower. Furthermore, the flexibility and efficiency of magnetic brackets align with the fast-evolving needs of the telecom industry, making it a future-ready solution.

SUMMARY

Water towers serve as ideal platforms for mounting telecommunications hardware due to their elevation and widespread distribution. However, securely attaching hardware to these structures can be challenging due to their curved surfaces, structural sensitivity, and material variability. A novel bracket system that utilizes several hundred high-strength rare-earth alloy magnets mounted on adjustable trays offers a robust solution. This system also incorporates threaded hover bolts beneath the magnets, which serve dual purposes: preventing premature attachment during installation and aiding in overcoming the magnetic force when repositioning or removing the bracket. This innovative design offers numerous benefits in adaptability, ease of installation, precision, safety, and environmental impact, making it a superior choice for modern telecommunications needs.

Water towers often feature curved ferro-magnetic surfaces that vary in dimensions and contours. The magnetic bracket system's use of individually adjustable trays allows precise alignment of the magnets with these surfaces. The trays can be tilted or inclined to conform to the tower's unique topography, ensuring maximum surface contact for optimal magnetic adhesion. This flexibility is particularly advantageous for irregularly shaped or aged water towers, where surface imperfections could otherwise hinder secure attachment.

By employing several hundred high-strength rare-earth alloy magnets such as those made from neodymium on each bracket, each of the brackets on a multi-bracket system, generates substantial holding power. This ensures that even under challenging conditions—such as high winds or vibrations from environmental factors—the bracket remains securely affixed to the water tower.

Traditional methods for mounting hardware on water towers, such as drilling or welding, often compromise the tower's structural integrity and protective coatings. These methods can lead to long-term issues, including rust, leaks, and costly repairs. The magnetic bracket eliminates these concerns by offering a completely non-invasive attachment method. The magnets adhere to the ferro-magnetic surface without requiring any alterations to the tower.

Additionally, threaded bolts reversibly extendable beneath the magnets prevent premature attachment during the installation process. This feature is particularly useful when handling the powerful magnets, allowing installers to position the bracket accurately before there exists contact between the magnets and the surface of the tower. This control minimizes accidental adherence that could damage the magnets, the tower's surface or even cause injury to an installer's fingers or hands.

Maintenance is equally simplified. The hover bolt design allows for easy removal and repositioning of the bracket without leaving any permanent marks or damage. This modularity is ideal for routine hardware upgrades or repairs, significantly reducing downtime and maintenance costs.

Telecommunications hardware, particularly directional antennas and signal receivers, requires precise alignment for optimal performance. The adjustable trays in the magnetic bracket enable fine-tuned orientation of the magnets, ensuring that the bracket conforms perfectly to the water tower's surface while maintaining the hardware's intended position. This capability is essential for achieving optimal signal strength and coverage.

The inclusion of hoover bolts plays a critical role in repositioning. When adjustments are necessary, the hover bolts can be used to lift the magnets slightly, breaking the magnetic seal without requiring excessive manually applied force. This feature allows for controlled realignment of the bracket and attached hardware, ensuring consistent and accurate positioning over time.

Handling high-strength rare earth magnets can pose safety risks due to their powerful attraction forces. The threaded hover bolts beneath the magnets mitigate these risks by providing a mechanism for controlled engagement and disengagement. During installation, the hover bolts prevent the magnets from prematurely attaching to the water tower's surface, giving installers sufficient opportunity to position the bracket accurately.

When repositioning or removing the bracket, the hover bolts can be used to lift the magnets incrementally, reducing the effort required to overcome their holding power. This controlled release minimizes the risk of injury to workers and damage to the bracket or tower surface. By incorporating these safety features, the design enhances usability and reduces potential hazards during installation and maintenance.

The bracket system's use of rare earth magnets provides exceptional load-bearing capacity, capable of securely supporting telecommunications hardware of various sizes and weights. This robustness ensures that antennas, receivers, and other equipment remain stable even in harsh environmental conditions, such as heavy winds, rain, or ice accumulation.

The individually adjustable trays further enhance stability by ensuring uniform distribution of the magnetic force across the water tower's surface. This even distribution reduces the risk of localized stress points, which could compromise the bracket's integrity over time. Combined with the inherent durability of rare earth magnets, this system offers a reliable and long-lasting mounting solution.

One of the most significant advantages of the magnetic bracket system is its minimal environmental impact. Traditional methods, such as drilling or welding, generate debris and potentially introduce pollutants into the potable water in the water tower. These invasive techniques can also damage the water tower's protective coatings, increasing the risk of rust and structural degradation.

In contrast, the magnetic bracket preserves the tower's surface by eliminating the need for permanent modifications. The use of threaded bolts to control magnet engagement ensures that the installation process is clean and precise, further reducing the likelihood of accidental surface damage. This environmentally friendly approach aligns with modern sustainability goals and helps extend the lifespan of the water tower.

The magnetic bracket system is highly versatile, accommodating a wide range of telecommunications applications. Its modular design allows for the attachment of various types of hardware, from small antennas to large equipment arrays. The individually adjustable trays and threaded bolt mechanisms make it easy to adapt the bracket to different configurations without requiring significant redesign.

This scalability also makes the system suitable for both temporary and permanent installations. For example, during short-term projects or testing phases, the bracket can be easily removed without leaving any lasting marks on the tower. For long-term deployments, its robust construction ensures stable and reliable performance over extended periods.

The combination of case of installation, non-invasive design, and modularity results in significant cost savings compared to traditional mounting methods. By eliminating the need for specialized tools, heavy equipment, or structural alterations, the magnetic bracket reduces initial installation costs. Its user-friendly design also minimizes labor requirements, further lowering expenses. Over the long term, the bracket's durability and adaptability contribute to ongoing savings. The ability to reposition the bracket using threaded hover bolts extends its usability, allowing it to accommodate evolving hardware needs without requiring a complete replacement. Additionally, by preserving the water tower's structural integrity, the system reduces the likelihood of costly repairs or maintenance to the tower itself.

Water towers often serve as prominent landmarks in residential or urban areas, making their appearance an important consideration. The magnetic bracket system's clean and organized design minimizes visual disruption, preserving the tower's aesthetic appeal. This is particularly valuable in communities where water towers are viewed as cultural or historical symbols.

The non-invasive nature of the system also ensures that the tower's original design remains intact, avoiding concerns over unsightly modifications or structural alterations. By balancing functionality with aesthetics, the magnetic bracket supports the dual role of water towers as infrastructure and community icons.

The magnetic bracket system for mounting telecommunications hardware to ferro-magnetic water towers represents a significant advancement in infrastructure technology. Its innovative use of high-strength rare earth magnets, adjustable trays, and threaded bolts provides unparalleled benefits in adaptability, precision, safety, and environmental preservation. By offering a non-invasive, cost-effective, and scalable solution, this system addresses the challenges of modern telecommunications installations while preserving the integrity and longevity of water towers. As a result, it stands out as a highly effective and sustainable choice for enhancing telecommunications infrastructure.

It is an object of the apparatus as disclosed herein to accommodate a wide range of telecommunications hardware for attachment to the apparatus.

Various objects, features, aspects, and advantages of the disclosed subject matter will become more apparent from the following detailed description of preferred embodiments, along with the accompanying drawings in which like numerals represent like components. The contents of this summary section are provided only as a simplified introduction to the disclosure and are not intended to be used to limit the scope of the appended claims.

The contents of this summary section are provided only as a simplified introduction to the disclosure and are not intended to be used to limit the scope of the appended claims.

DETAILED DESCRIPTION

The disclosed apparatus is directed to magnetic mounting hardware that is highly adaptable to the topography of the surface of a structure that is fabricated from a ferromagnetic material. The close alignment of the magnetic mounting hardware coupled with substantial magnetic holding power yields magnetic mounting hardware that is capable of restraining multiple telecommunications hardware components atop a water tower even when subject to powerful wind and seismic events.

Figure 1:
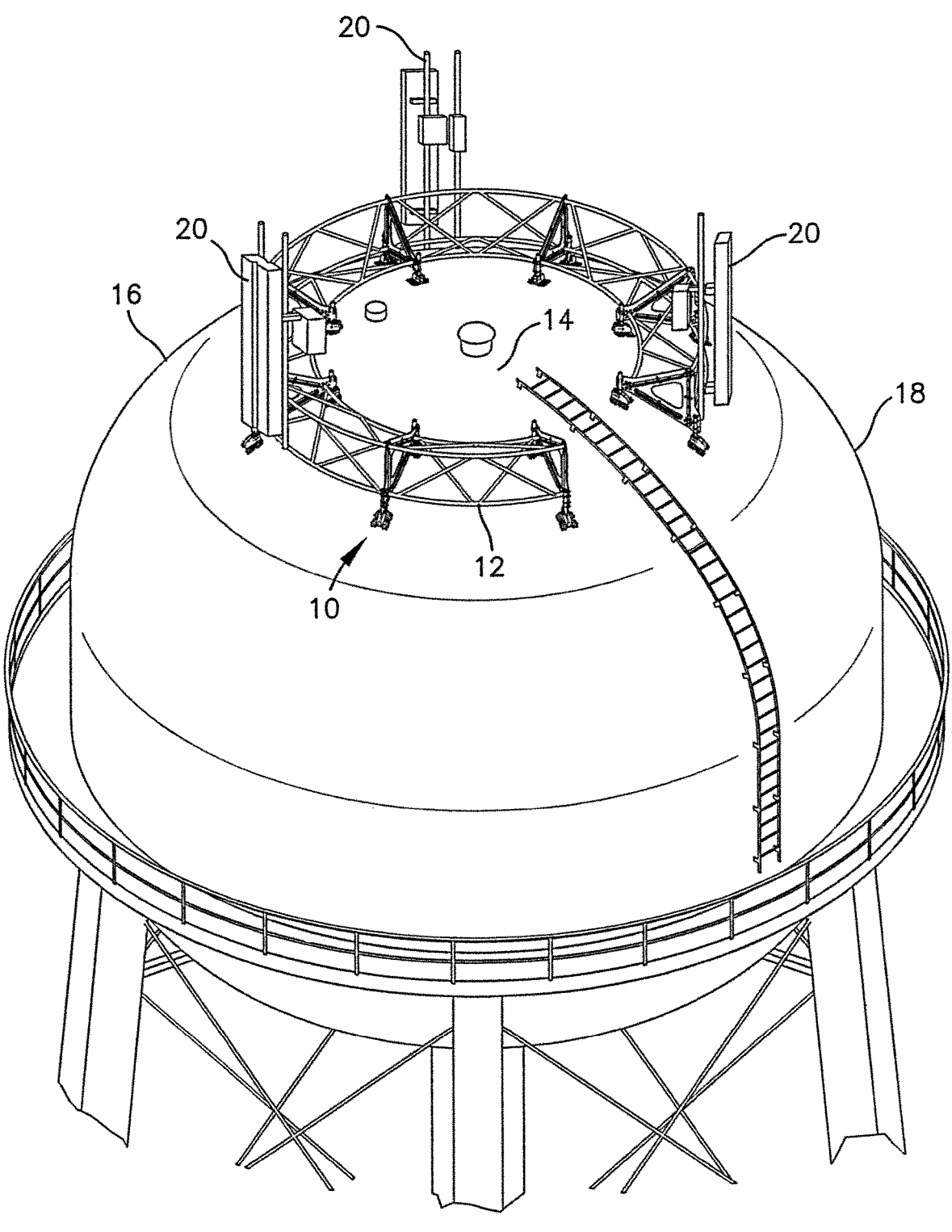
FIG. 1 illustrates a perspective view of an embodiment of the magnetic mounting hardware secured to the surface of a water tower structure.

FIG. 1 illustrates an embodiment of the magnetic mounting hardware 10 in use to restrain an embodiment of a roof corral 12 to the upper surface 14 of a water tower 16. The water tower 16 upper surface 14 and side walls 18 are fabricated from ferro-magnetic material to facilitate attachment of the magnetic mounting hardware 10. The roof corral 12 as disclosed at FIG. 1 is supporting various hardware components 20 consisting of telecommunications equipment such as transmitters, receivers, GPS, backup power sources, and base receiver stations among other types of hardware.

Figure 2:
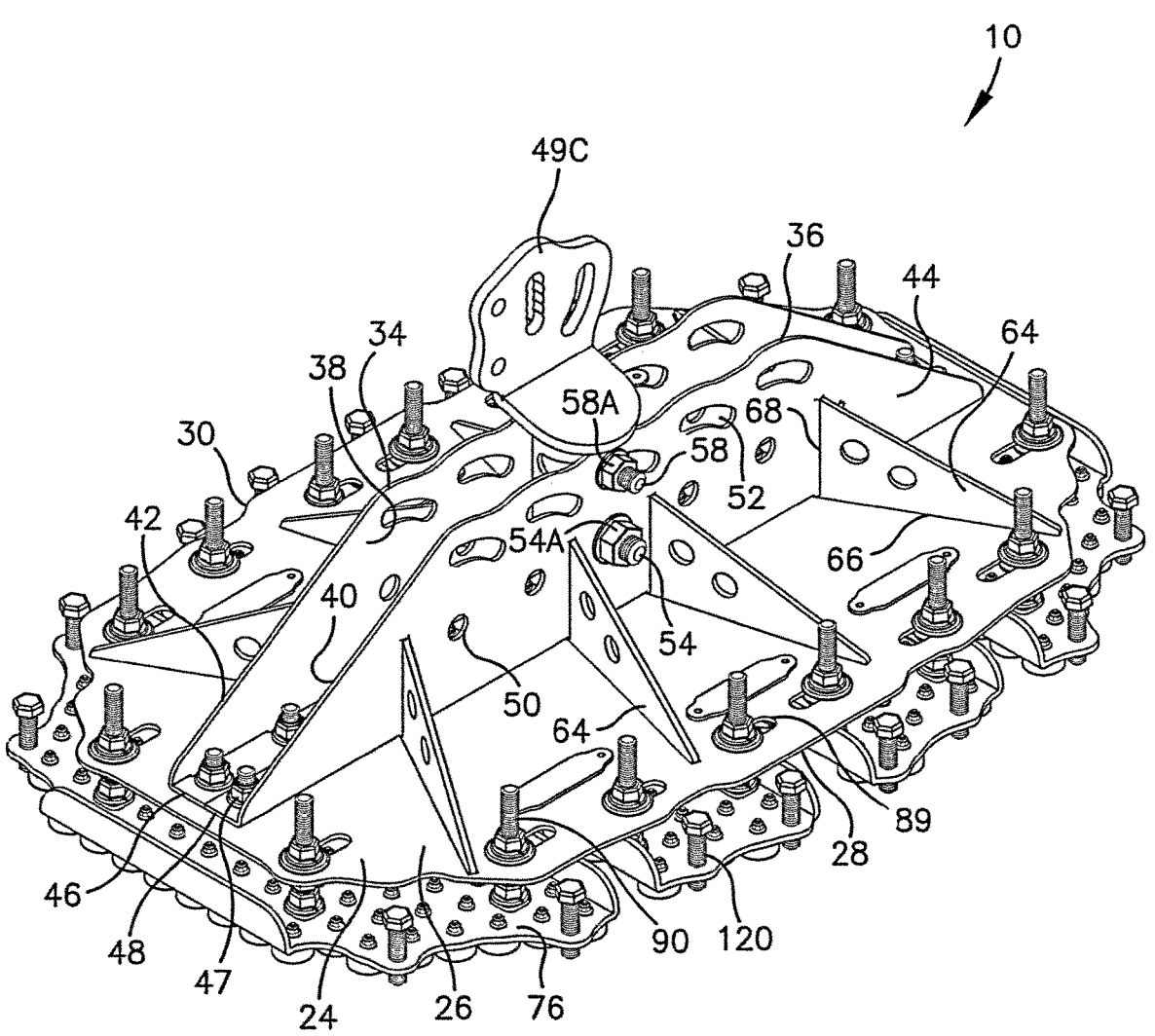
FIG. 2 illustrates a perspective view of an embodiment of the magnetic mounting hardware in isolation.

FIG. 2 illustrates an embodiment of the magnetic mounting hardware 10 in isolation for securing the hardware components 20 to the ferro-magnetic upper surface 14 of the water tower 16. The magnetic mounting hardware 10 includes a base plate 24 with an upper surface 26, a lower surface 28 and a circumferential surface 30. The base plate 24 is preferably fabricated from non-magnetic stainless-steel and has a nominal thickness of approximately 0.25 inches. Non-magnetic stainless-steel types, such as those with an austenitic crystal structure, are greatly preferred in the fabrication of the magnetic mounting hardware 10 because the powerful magnets utilized by the hardware 10 are not attracted to the base plate 24 or any of the other components utilized in the fabrication of the hardware 10. The thickness of the base plate 24 may vary from one embodiment to the next depending upon the loads that are anticipated due primarily to the number and weight of the telecommunications hardware components 20.

Figure 3:
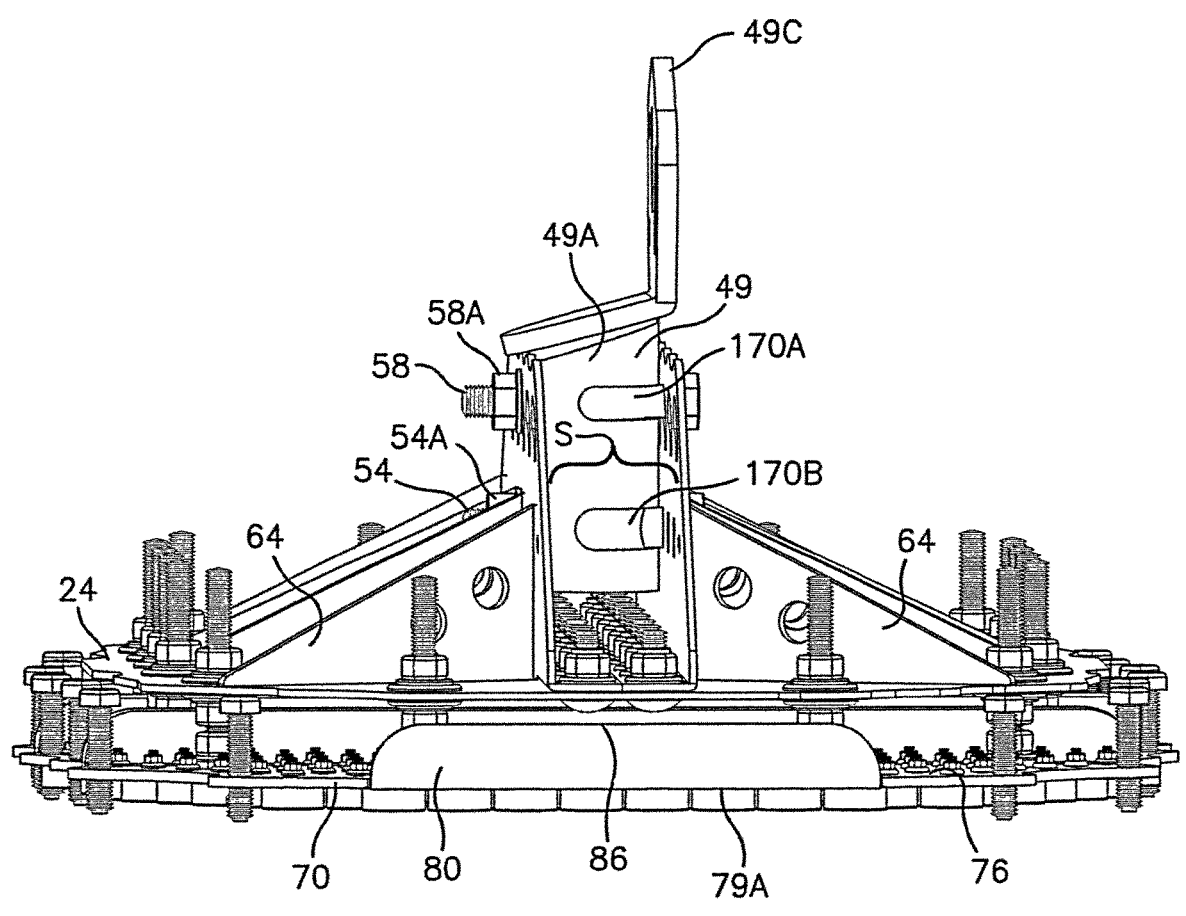
FIG. 3 illustrates a front elevation view of an embodiment of the magnetic mounting hardware.

As further illustrated at FIG. 2, the magnetic mounting hardware 10 includes a spaced apart pair of securement members 34, 36 mounted substantially perpendicular to the upper surface 26 of the base plate 24. Each of the securement members 34, 36 includes an inner face 38, 40 and an outer face 42, 44. The lower flanges 46, 48 of each of the securement members 34, 36 are preferably secured to the upper surface 26 of the base plate 24 with fasteners 47. As illustrated at FIG. 3, the spacing S between the securement members 34, 36 is dependent upon the kick-blade assembly 49 that is positioned between the securement members.

Figures 9A, 9B, 9C:
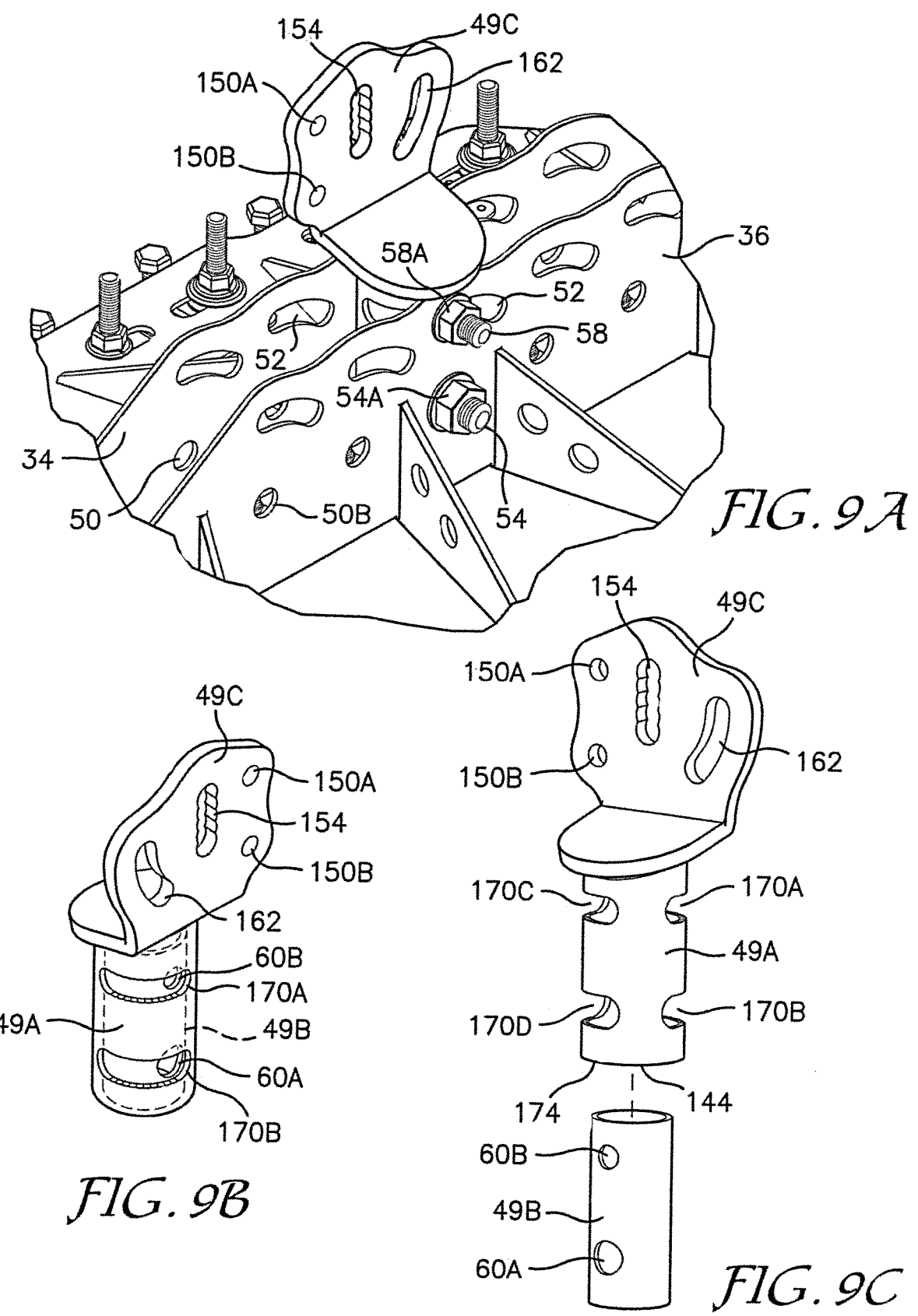
FIG. 9A illustrates a perspective view of an embodiment of the kick-blade apparatus disposed between the securement members.
FIG. 9B illustrates a perspective view of an embodiment of the kick-blade apparatus disposed in isolation.
FIG. 9C illustrates a perspective view of an embodiment of the insert pipe ready for insertion into the interior space of the kick-blade tube.

The kick-blade assembly 49 includes the kick-blade tube 49A, an insert pipe 49B (as best illustrated at FIG. 9B) and the paddle 49C. The minimum required diameter and wall thickness of the kick-blade tube 49A is confirmed by calculating the total load from the roof corral assembly 12 along with the weight of the telecommunication hardware components 20. The kick-blade assembly 49 must be sufficiently robust to support the combined weight of the roof corral 12 and the hardware components 20 without either elastically or plastically deforming when considering intense dynamic loads that may be applied by powerful wind or seismic induced events.

The securement members 34, 36, as illustrated at FIG. 2, also each include at least one through hole 50 disposed beneath at least one slot 52. The at least one through hole 50 is sized and positioned to secure the kick-blade assembly 49 between the securement members 34, 36 with the lower end proximate the base plate 24. As best understood by viewing FIGS. 2, 9B and 9C, a fastener 54 is passed through the first securement member 34 then through slots 170B, 170D in the kick-blade tube 49A, openings 60A in the insert pipe 49B and finally through the second securement member 36 where preferably a nut 54A is threaded onto the fastener 54 preventing the fastener 54 from withdrawing from the securement members 34, 36 and the kick-blade assembly 49.

A preferred embodiment of the magnetic mounting hardware includes between two and ten through holes 50 in each of the securement members 34, 36 thereby providing considerable flexibility in positioning the kick-blade assembly 49 within the space S between the securement members 34, 36. The sizing of the through holes 50 and openings 60A and slots 170B, 170D are dependent upon the anticipated loads applied to the fastener 54 by the roof corral 12 and associated telecommunications equipment 20.

As illustrated at FIGS. 2 and 3, the at least one slot 52 is preferably arcuate in configuration to facilitate some movement of the magnetic mounting hardware 10 relative to the kick-blade assembly 49. This movement enables optimal placement of the magnetic mounting hardware 10 upon the upper surface 14 of the water tower 16. A fastener 58 is passed through the at least one slot 52 of the first securement member 34 through slots 170A, 170C in the kick-blade tube 49A openings 60B in the insert pipe 49B (see FIGS. 9B and 9C) and then through the second slot 52 in the second securement member 36 where preferably a nut 58A is threaded onto the fastener 58 preventing the fastener from withdrawing from the securement members 34, 36 and kick-blade assembly 49A. A preferred embodiment of the magnetic mounting hardware 10 includes between two and ten slots 52 in each of the securement members 34, 36. The sizing of the slots 52, 170A, 170C and openings 60B are dependent upon the anticipated loads applied to the fastener 58 by the roof corral 12 and the associated telecommunications equipment 20.

As illustrated at FIGS. 2 and 3, at least one stiffener plate 64 is disposed against the outer face 42, 44 of each of the securement members 34, 36 and the base plate 24 to restrain against undesired bending or flexing of the securement members. A preferred embodiment of the stiffener plates 64 is triangular in configuration. The lower edges 66 and the side edges 68 of the stiffener plates 64 are preferably welded respectively to the upper surface 26 of the base plate 24 and the outer faces 42, 44 of the securement members 34, 36. The stiffener plates 64 are preferably fabricated from stainless steel and of sufficient thickness to prevent buckling of the securement members 34, 36. In a preferred embodiment a total of four stiffener plates are utilized per securement member 34, 36.

Figures 4, 4A:
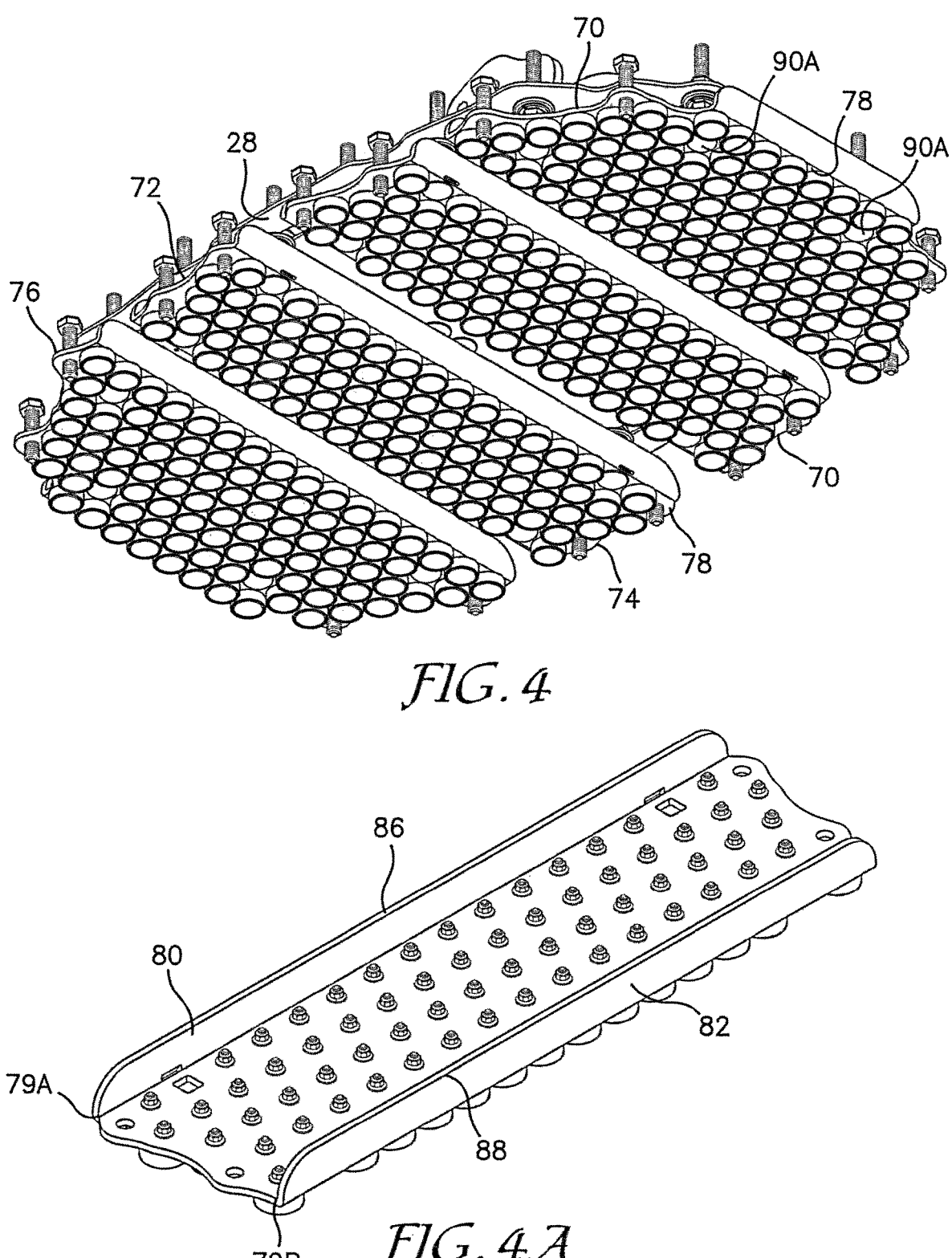
FIG. 4 illustrates a bottom perspective view of the trays of an embodiment of the magnetic mounting hardware.
FIG. 4A illustrates a top perspective view of an embodiment of a single tray in isolation.

As illustrated at FIG. 4, disposed beneath the lower surface 28 of the base plate 24 are a plurality of trays 70 spaced apart from one another and from the lower surface of the base plate. Mounted to the base plate 24 the spaced apart trays 70 each include a first longitudinal end 72, a second longitudinal end 74, an upper surface 76 and a lower surface 78. The first and second longitudinal ends 72, 74 of each of the trays 70 extends roughly consistent with the circumferential surface 30 of the base plate 24. As illustrated at FIG. 4A, extending upwardly from the laterally oppose outer edges 79A, 79B of each of the plurality of trays 70 are upwardly extending flanges 80, 82 that terminate at upper edges 86, 88. These upwardly extending flanges 80, 82 serve to further enhance the stiffness of the trays 70 preventing inadvertent bending of the trays under loads applied by the roof corral 12 and associated telecommunications hardware 20.

Figure 5:
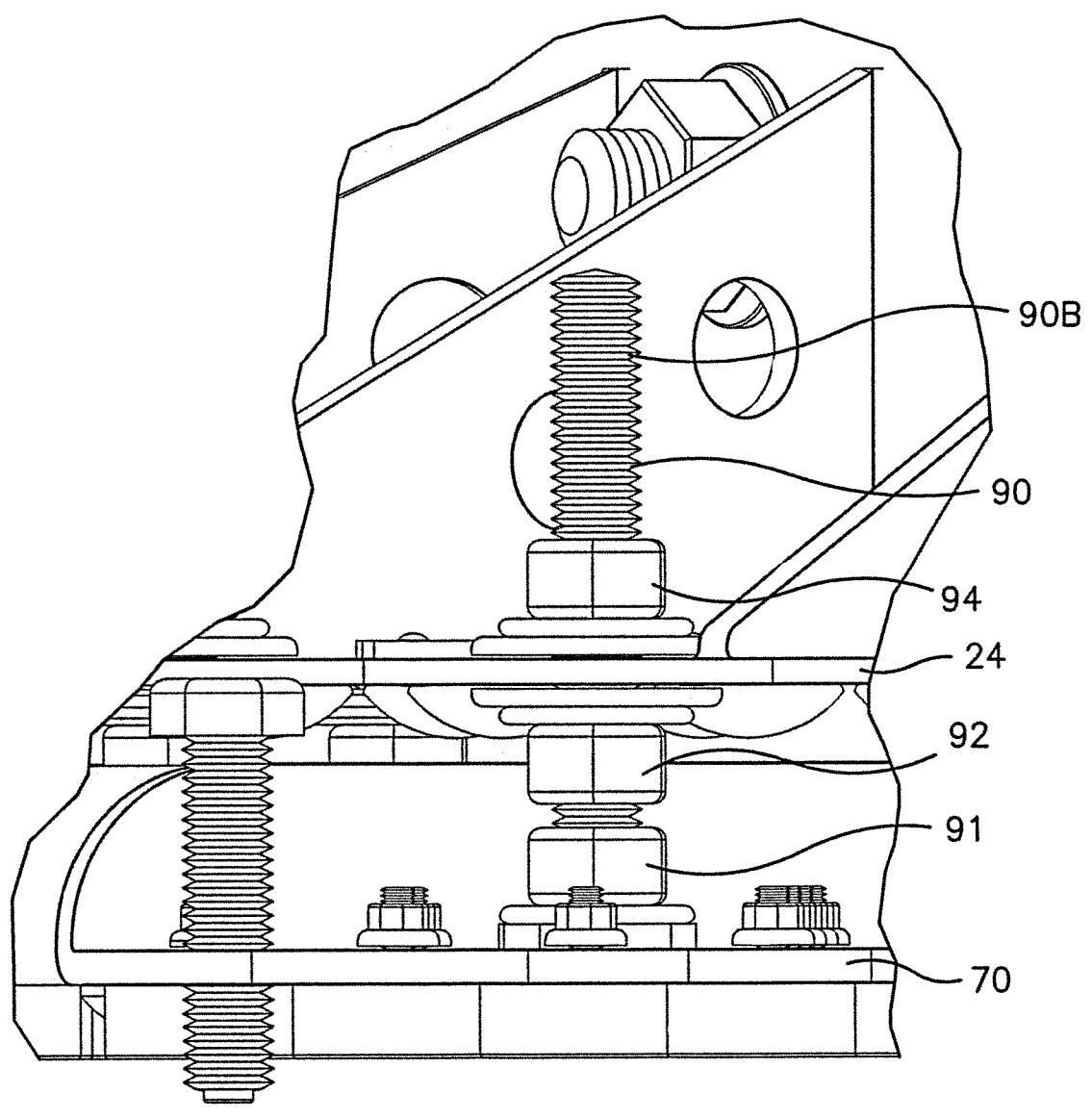
FIG. 5 illustrates a view of the hardware utilized to control the inclination of the trays relative to the base plate and to secure the trays to the base plate.

The trays 70 as illustrated at FIGS. 2 and 5 are mounted to the base plate 24 using fasteners 90. The fasteners 90 extend through both the trays 70 and longitudinally extending slots 89 in the base plate 24 thereby allowing positional adjustment of the trays 70 relative to the base plate 24. As best illustrated at FIG. 4, the head 90A of the fastener 90 is preferably positioned beneath the tray 70 and is in contact with the lower surface 78. As illustrated at FIG. 5, the shaft 90B of the fastener 90 extends upward, through and beyond the slot 89 in the base plate 24 and terminates above the upper surface 26 of the base plate.

As illustrated at FIGS. 3 and 5, to prevent the fastener 90 from pulling the upper edges 86, 88 of the trays 70 into contact with the lower surface 28 of the base plate 24 and to optimally provide some measure of control over the orientation of the trays 70 relative to the base plate 24 a first spacing nut 91 is threaded onto the shaft 90B of the fastener 90 and positioned atop the upper surface 76 of the tray 70. Next, a second spacing nut 92 is threaded onto the fastener 90 and is spaced apart from the installed first spacing nut 91. Finally, when the desired spacing between the first and second spacing nuts 91, 92 is achieved, a third nut 94 is threaded onto the fastener 90 and rests atop the base plate 24 securing the fastener 90 into position.

As illustrated at FIG. 5, the precise placement of each of the nuts 91, 92, 94 along the shaft 90B of the respective fasteners 90 dictates the inclination of the tray 70 relative to the base plate 24. Adjustment of the nuts 92, 94 higher, lower, closer or further apart from one another on the fastener shaft 90B facilitates inclination of the tray 24 for purposes of alignment with the upper surface 14 of the water tower 16. The significance of having proper alignment of the plurality of trays 70 with the upper surface 14 of the water tower 16 is critical to optimize the pull of the plurality of high-performance magnets.

Figure 6:
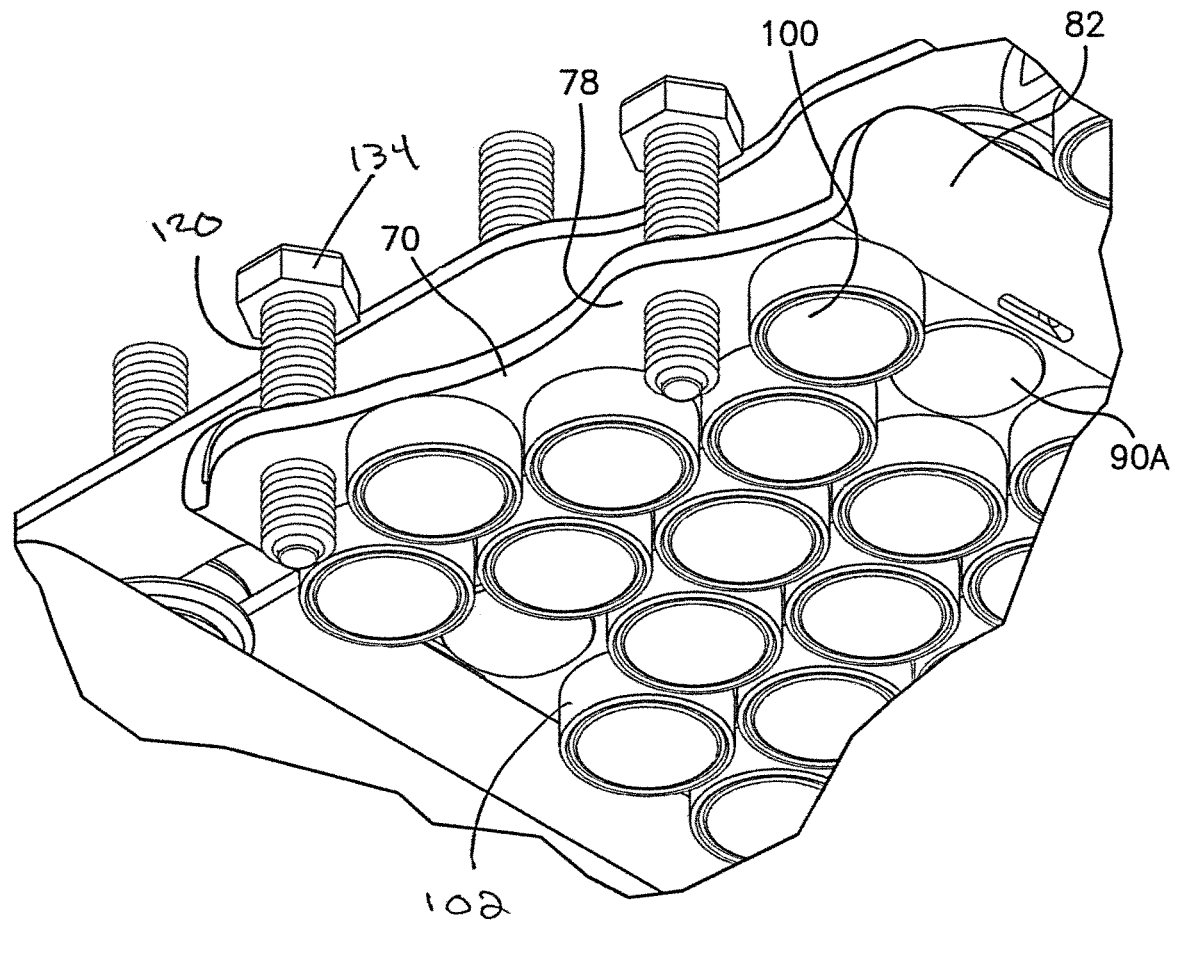
FIG. 6 illustrates a bottom perspective view of an embodiment of the plurality of magnets mounted to the bottom of a tray as well as hover bolts extending through the base plate.
Figure 7:
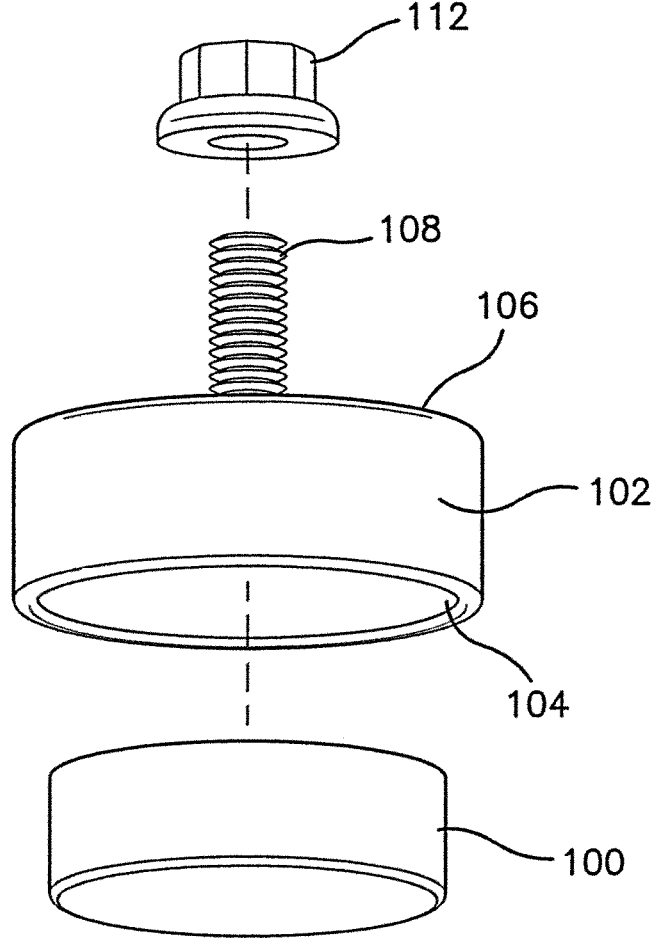
FIG. 7 illustrates an assembly view of an embodiment of a magnetic disc disposed and a metal cup with threaded extension.

As best illustrated at FIG. 6, mounted beneath the lower surface 78 of each of the of trays 70 are a plurality of magnets 100. A preferred embodiment of the magnetic mounting hardware 10 utilizes eighty (80) magnets disposed beneath each tray 70; however, the number of magnets per tray 70 may be greater or lesser depending upon the application and the demand for magnetic holding power. As illustrated at FIG. 7, the magnets 100 preferred for this application are neodymium (rare earth) disc magnets that also are preferably securely potted inside of a metal cup 102 and fully surrounded on the circumference of the entire magnet 100 with epoxy 104. A preferred "maximum energy product" designation for the magnets is N42 as they provide high performance at an economical price.

As illustrated at FIG. 7, extending outwardly from the base 106 of each metal cup 102 is a threaded extension 108. Starting at the lower surface 78, the threaded extension 108 is passed through an opening (not shown) in the tray 70 and once above the upper surface 76 a nut 112 is threaded to the extension 108 securing the neodymium disc magnet 100 immersed in cup 102 with epoxy 104 against the lower surface 78 of the tray 70. The multitude of these powerful rare earth magnets 100 mounted to the magnetic mounting hardware 10 provides tremendous power of attraction to the upper surface 14 of the water tower 16.

The magnetic pulling power of these hundreds of magnets 100 can lead to challenges in mounting and removing the magnetic mounting hardware 10. As the distance between the magnets 100 and the upper surface 14 of the water tower 16 decreases the magnetic attraction increases. This is because the magnetic field strength increases with decreasing distance. The closer the magnet is to the surface, the stronger the magnetic force will be.

While many factors enter into the determination of the magnetic pull force to include the type and thickness of the steel utilized on the water tower, the direction of the applied force, the ambient temperature, moisture and whether any coating systems are utilized, the pulling power of the disclosed embodiments of the hardware system 10 is significant. Performance testing has confirmed a force exceeding 5,000 pounds applied perpendicularly to the metal surface is required to extract the hardware 10 when eighty rare-earth magnets 100 are utilized per tray 70 with a total of four trays in use. Consequently, when placing the hardware 10 near the metal surface, care must be taken to prevent the nearly instantaneous and powerful attraction of the magnets to the surface that could cause incorrect placement of the hardware upon the surface or result in injury.

To address this concern, the disclosed hardware 10 utilizes hover bolts 120. In a preferred embodiment of the hardware 10, and as disclosed at FIGS. 2 and 8, a total of sixteen (16) hover bolts 120 are utilized (four per tray); however, a lesser and greater number of hover bolt assemblies are contemplated by this disclosure and may be equally effective. At least one, and preferably two, through holes 124 are placed in each of the trays 70 at the longitudinally opposed first and second ends 72, 74. A preferred embodiment of the hover bolt is a 2-inch long, ½inch-13 stainless steel bolt; however, other lengths and diameters are contemplated by this disclosure.

Figure 8:
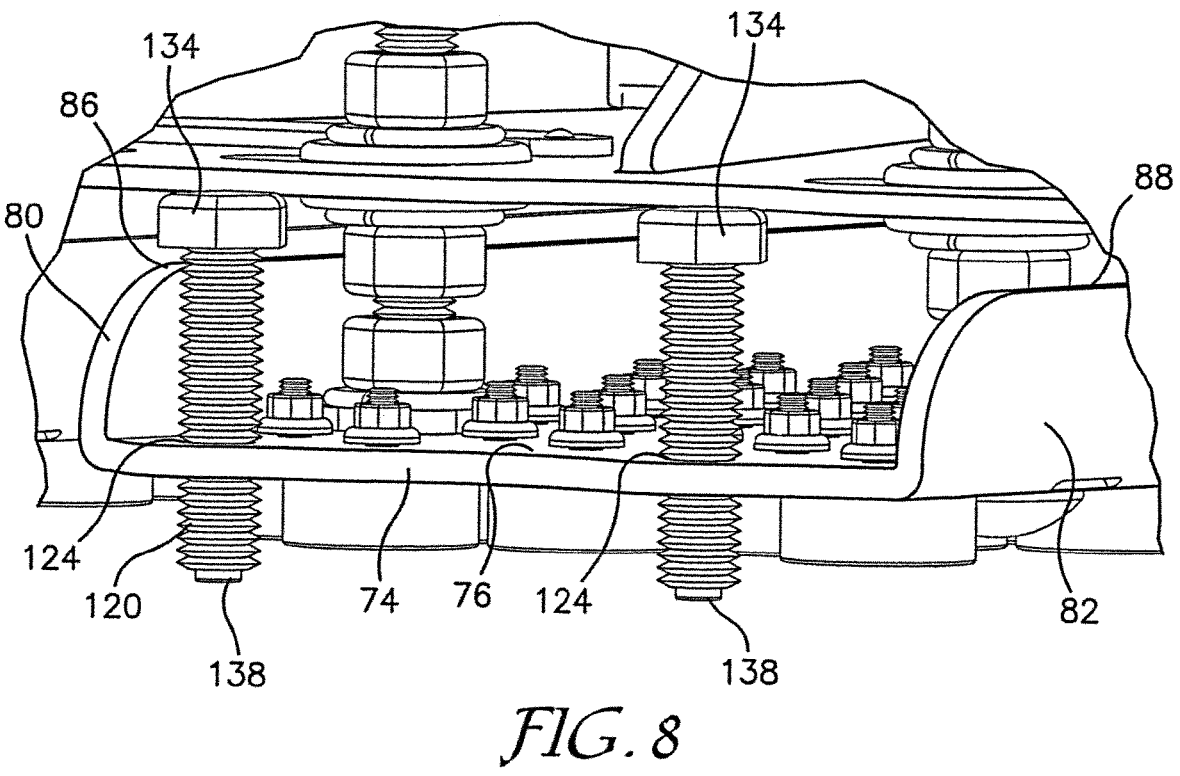
FIG. 8 illustrates an embodiment of the hover bolt assemblies at the edge of a tray.

As illustrated at FIG. 8, the tips 138 of the threaded hover bolts 120 are preferably coated with a cushioning material, such as an engineered polymer, that serves to prevent marring, penetration or damage to any protective coatings that may be applied to the upper surface 14 of the water tower 16. In a preferred embodiment, the through holes 124 are tapped (threaded) to receive the hover bolt 120 with a head 134. The hover bolts 120 are positionally available without obstruction for manual adjustment; however, when removing the magnetic mounting hardware 10 from the surface 14 of the tower 16, tools may be required to turn the head 134 of the bolt 120 due to the significant holding power of the assembled magnets 100.

In operation, before mounting the disclosed hardware 10 to the upper surface 14 of the water tower 16, the hover bolts 120 are rotatably extended downward to their fullest extension thereby equalizing the extension of all the hover bolts 120. In addition, the inclination of each of the trays 70 and the associated magnets 100 should be optimally aligned with the surface to which it is to contact to achieve maximum pulling power of the employed magnets 100.

As previously detailed, to control orientation of the trays 70 and associated magnets 100 relative to the base plate 24, the three spacing nuts 91, 92, 94 threaded to the fasteners 90 are adjusted up and down to raise and lower as necessary areas of the tray 70 to achieve tray 70 inclination consistent with the topography of the upper surface 14 of the water tower 16. To achieve the desired inclination of the trays 70 may require some nominal level of experimentation with the position of the spacing nuts 92, 94 on the threaded fastener 90. To achieve the desired optimal alignment of the trays to the upper surface 14 may require adjustment of the connection of the kick-blade assembly 49 to the securement members 34, 36 as is discussed below.

Figure 10:
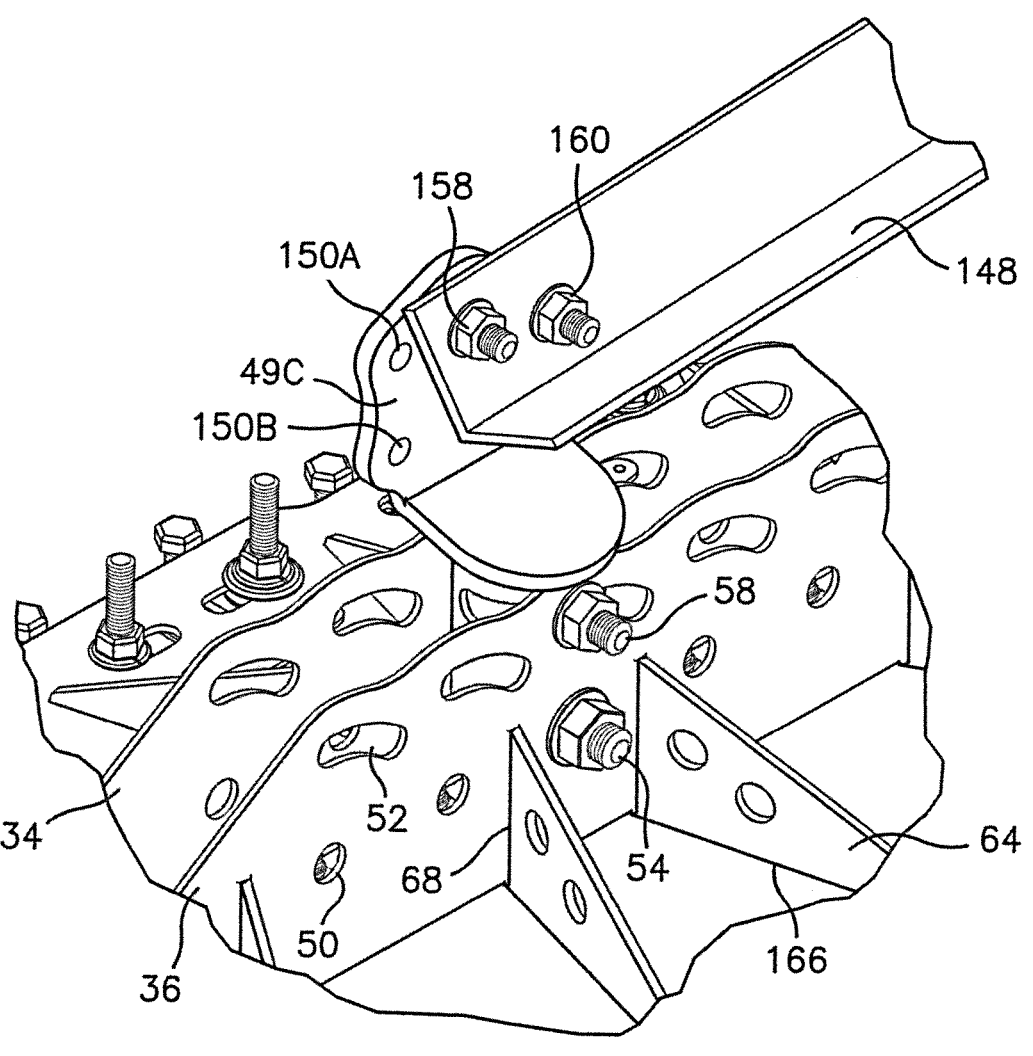
FIG. 10 illustrates a perspective view of an embodiment of the kick-blade assembly with an angle iron attached thereto.

In an embodiment of the magnetic mounting hardware 10 as illustrated at FIGS. 9A, 9B and 9C, utilizes a two-part system identified as a kick-blade assembly 49. The kick-blade assembly 49 includes a kick-blade tube 49A, an insert pipe 49B that is preferably hot glued or otherwise temporarily held in position between the span S between the securement members 34, 36. The kick-blade assembly 49 is capable of rotating about the vertical Z-Axis which is an important attribute allowing the kick-blade assembly 49 (as illustrated at FIG. 10) to accommodate any angle of attachment hardware that is used when, for example, a structural support member 148 such as a pipe tube or angle iron member is mounted to the kick-blade assembly 49 by using any assortment of the openings 150A, 150B, 154, 162 in the paddle 49C. The choice provided by the through hole pattern 150A, 150B, 154, 162 facilitates vertical displacement of the structural support member 148 on the blade paddle 49C while the center slot 154 is employed for retaining a single fastener 158. A separate fastener 160 may also be inserted into the crescent shaped slot 162 providing additional holding power.

When in position the kick-blade tube 49A can rotate along two sets of knurled channels 170A, 170B, 170C and 170D. The insert pipe 49B is received into the interior space 144 of the kick-blade tube 49A and is critical for preventing movement of the paddle 49C. The insert pipe 49B has an outside diameter slightly less than the inside diameter 174 of the kick-blade tube 49A to prevent interference during insertion of the insert pipe 49B.

As illustrated at FIGS. 9A and 10, when the kick-blade assembly 49 is fully assembled and in position between the securement members 34, 36 a first threaded fastener 58 is passed through the slot 52 in the first securement member 34, through the two upper channels 170A, 170C in the kick-blade tube 146, into an upper opening 60B in the insert pipe 49B and then out through the slot 52 in the second securement member 36 where a nut 58A is fastened to prevent the fastener 58 from being withdrawn. A preferred fastener 58 for this application is a ⅝-inch×7-inch zinc hex bolt.

The kick-blade assembly 49 is further retained in position between the first and second securement members 34, 36 with the aid of a second fastener 54 that passes into the through hole 50 in the first securement member 34 then through the two lower channels 170B, 170D in the kick-blade tube 49A, into the lower opening 60A in the insert pipe 49B and then out the through hole 50 in the second securement member 36 where a nut 54A is fastened to prevent the fastener 54 from being withdrawn. A preferred fastener 54 for the lower point of attachment are ¾-inch×7-inch zinc hex bolts.

Once the kick-blade assembly 49 is in position between the securement members 34, 36 the installer can connect the structural support member 148 to the blade paddle 49C on either the left or right side of the magnetic mounting hardware 10. If the structural support member 148 is too long and overextends the kick-blade paddle 49C for connection purposes, the installer has the option to rotate the kick-blade tube 49A by 180 degrees thereby providing increased clearance. Additionally, the plurality of upper slots 52 and lower holes 50 in the securement members 34, 36 provide considerable positional flexibility for placement of the kick-blade assembly 49 atop the base plate 24.

As best illustrated at FIG. 1, a plurality of the magnetic mounting hardware 10 are utilized on the roof corral 12. FIG. 1 illustrates a total of sixteen (16) magnetic mounting hardware units 10 secured to the roof corral 12; however, a greater or lesser number of magnetic mounting hardware units 10 per roof corral 12 are contemplated by this disclosure. Each magnetic mounting hardware 10 unit provides considerable holding power for the roof corral 12 and the associated telecommunications hardware 20.

The magnetic mounting hardware units 10 may optionally be attached to the roof corral 12 using the highly adaptable kick-blade assemblies 49 that each include a kick-blade tube 49A with a paddle 49C, an insert pipe 49B and structural support members 148. The fully assembled roof corrals 12 and the associated magnetic mounting hardware units 10 are preferably lifted by a crane into position atop the upper surface 14 of the water tower 16.

Prior to engagement with the upper surface 14, the hover bolts 120 are advanced downward to their fullest extent thereby preventing inadvertent attachment of the mounting hardware 10 to the upper surface 14. Additionally, the inclination of each of the trays 70 residing beneath the base plate 24 are adjusted by means of the inclination hardware 90, 90B, 92, 94 to match the topography of the upper surface 14. Once the inclination of the trays 70 are fully aligned to the topography of the upper surface 14 the hover bolts 120 are rotatably withdrawn above the level of the magnets 100 by rotation of the heads 134. Once the hover bolts 120 are all withdrawn above the level of the magnets 100, the corral 12 and along with the magnetic mounting hardware 10 can be lowered into position and fixedly positioned atop the upper surface 14 by the power of the associated magnets 100.

The disclosed magnetic mounting hardware should not be construed as limiting in any way. Instead, the present disclosure is directed toward all novel and nonobvious features and aspects of the various disclosed embodiments, alone and in various combinations and sub-combinations with one another. The disclosed apparatus and systems are not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. I therefore claim as my invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

I claim:

1. An apparatus for securing hardware to a ferromagnetic surface of a structure, the apparatus comprising:

a base plate with an upper surface, a lower surface and a circumferential surface;

a spaced apart pair of securement members mounted substantially perpendicular to the upper surface of the base plate, each of the securement members comprising an inner face and an outer face;

a plurality of trays spaced apart from one another and from the lower surface of the base plate and mounted to the base plate, the spaced apart trays each comprising a first longitudinal end, a second longitudinal end, an upper surface and a lower surface; and a plurality of magnets mounted to the lower surface of each of the plurality of trays.

2. The apparatus of claim 1, wherein at least one stiffener plate is disposed against the outer face of each of the securement members to restrain against bending of the securement members.

3. The apparatus of claim 1, wherein at least one through hole is disposed beneath at least one slot in each of the pair of securement members.

4. The apparatus of claim 1, wherein an angle of inclination of each of the plurality of the trays relative to the base plate may be individually modified to optimize contact between the plurality of magnets and the surface of the structure.

5. The apparatus of claim 4, wherein a plurality of inclination members are operable to modify the inclination of the plurality of trays relative to the base plate and to simultaneously secure the plurality of trays to the base plate.

6. An apparatus for securing hardware to a ferromagnetic surface of a structure, the apparatus comprising:

a base plate with an upper surface, a lower surface and a circumferential surface;

a spaced apart pair of securement members mounted substantially perpendicular to the upper surface of the base plate, each of the securement members comprising an inner face and an outer face;

a plurality of trays spaced apart from one another and from the lower surface of the base plate and mounted to the base plate, the spaced apart trays each comprising a first longitudinal end and a second longitudinal end, an upper surface and a lower surface;

a plurality of magnets mounted to the lower surface of each of the plurality of trays; and at least one hover member disposed at the first and second longitudinal ends of each of the trays, the at least one hover member on each tray end operable to overcome the attraction of the plurality of magnets prior to either contacting the surface of the structure or for overcoming the attraction of the plurality of magnets once in contact with the surface of the structure.

7. The apparatus of claim 6, wherein at least one stiffener plate is disposed against the outer face of each of the securement members to restrain against bending of the securement members.

8. The apparatus of claim 6, wherein at least one through hole is disposed beneath the at least one slot in each of the pair of securement members.

9. The apparatus of claim 6, wherein the securement members are spaced apart a distance marginally greater than the diameter of a tubular member operable to support a framework for the mounting of hardware.

10. The apparatus of claim 9, wherein the tubular member comprises a kick-blade tube and an insert pipe, the kick-blade tube further comprising a paddle for mounting of a structural support member to the paddle.

11. The apparatus of claim 9, wherein a first threaded retaining member is passed through the at least one through hole in each of the pair of securement members as well as a through hole in the tubular member to secure the tubular member to the apparatus.

12. The apparatus of claim 11, wherein a second threaded retaining member is passed through the at least one slot in each of the pair of securement members as well as a through hole in the tubular member to secure the tubular member to the apparatus and to allow nominal rotation of the tubular member relative to the apparatus.

13. The apparatus of claim 6, wherein a plurality of inclination members are operable to modify the inclination of each of the plurality of trays relative to the base plate and to simultaneously secure the plurality of trays to the base plate.

14. The apparatus of claim 6, wherein the at least one hover member is disposed within a threaded through hole at each longitudinally opposed end of the plurality of trays.

15. The apparatus of claim 14, wherein the at least one hover member may be advanced and retracted from the through hole.

16. The apparatus of claim 6, wherein the at least one hover member comprises a head end and a shaft end, the through hole and threaded fastener received therein operable to threadedly extend the shaft end beneath the level of the plurality of magnets thereby preventing contact between the plurality of magnets and the surface of the structure.

17. The apparatus of claim 6, wherein in the range of 50 to 150 magnets are mounted to the lower surface of each of the plurality of trays.

18. The apparatus of claim 6, wherein the plurality of magnets is comprised of a rare-earth alloy composition.

19. The apparatus of claim 6, wherein each of the plurality of magnets are surrounded by epoxy within a metal cup, the metal cup comprising a base, a circumferential wall and a threaded rod extending outwardly from the base.

20. The apparatus of claim 19, wherein each of the plurality of magnets abuts the lower surface of a respective tray with the threaded rod extending upwardly beyond the upper surface of the respective tray for engagement with a nut.

21. The apparatus of claim 6, wherein the position of the plurality of trays are longitudinally adjustable along the base plate.

22. The apparatus of claim 21, wherein slots are disposed within the base plate to facilitate movement of the plurality of trays.

* * * * *